United States Patent
Wang et al.

(10) Patent No.: US 11,967,096 B2
(45) Date of Patent: Apr. 23, 2024

(54) METHODS AND APPARATUSES OF DEPTH ESTIMATION FROM FOCUS INFORMATION

(71) Applicant: MEDIATEK INC., Hsinchu (TW)

(72) Inventors: Ren Wang, Hsinchu (TW); Yu-Lun Liu, Hsinchu (TW); Yu-Hao Huang, Hsinchu (TW); Ning-Hsu Wang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 275 days.

(21) Appl. No.: 17/677,365

(22) Filed: Feb. 22, 2022

(65) Prior Publication Data

US 2022/0309696 A1   Sep. 29, 2022

Related U.S. Application Data

(60) Provisional application No. 63/200,692, filed on Mar. 23, 2021.

(51) Int. Cl.
   *G06T 7/571*       (2017.01)
   *G06N 20/00*       (2019.01)
   (Continued)

(52) U.S. Cl.
   CPC ............. *G06T 7/571* (2017.01); *G06N 20/00* (2019.01); *G06T 7/557* (2017.01); *H04N 5/2226* (2013.01); *H04N 23/67* (2023.01)

(58) Field of Classification Search
   CPC .................. G06T 7/571; G06T 7/557; G06T 2207/10148; G06T 2207/20081; G06T 2207/20084; G06T 2207/10016; G06N 20/00; G06N 3/0455; G06N 3/088; G06N 3/09; G06N 3/08; H04N 5/2226;
   (Continued)

(56) References Cited

U.S. PATENT DOCUMENTS

| | | |
|---|---|---|
| 11,527,005 B2 | 12/2022 | Ren et al. |
| 2015/0288946 A1 | 10/2015 | Hong et al. |

(Continued)

FOREIGN PATENT DOCUMENTS

| | | |
|---|---|---|
| CN | 111739078 A | 10/2020 |
| CN | 111739082 A | 10/2020 |
| TW | 202105324 A | 2/2021 |

OTHER PUBLICATIONS

Chinese language office action dated Oct. 31, 2022, issued in application No. TW 111110302.

*Primary Examiner* — Stephen P Coleman
(74) *Attorney, Agent, or Firm* — McClure, Qualey & Rodack, LLP

(57) ABSTRACT

A depth estimation from focus method and system includes receiving input image data containing focus information, generating an intermediate attention map by an AI model, normalizing the intermediate attention map into a depth attention map via a normalization function, and deriving expected depth values for the input image data containing focus information from the depth attention map. The AI model for depth estimation can be trained unsupervisedly without ground truth depth maps. The AI model of some embodiments is a shared network estimating a depth map and reconstructing an AiF image from a set of images with different focus positions.

19 Claims, 4 Drawing Sheets

(51) Int. Cl.
  *G06T 7/557* (2017.01)
  *H04N 5/222* (2006.01)
  *H04N 23/67* (2023.01)
(58) Field of Classification Search
  CPC .... H04N 23/67; H04N 23/617; H04N 23/676;
              H04N 2013/0081
  USPC ......................................................... 382/154
  See application file for complete search history.

(56) References Cited

U.S. PATENT DOCUMENTS

2017/0308770 A1\* 10/2017 Jetley ................... G06V 10/462
2020/0302629 A1    9/2020 Jie et al.
2021/0027480 A1    1/2021 Ren et al.
2021/0390723 A1   12/2021 Ye et al.

\* cited by examiner

METHODS AND APPARATUSES OF DEPTH ESTIMATION FROM FOCUS INFORMATION

CROSS REFERENCE TO RELATED APPLICATIONS

The present invention claims priority to U.S. Provisional Patent Application Ser. No. 63/200,692, filed on Mar. 23, 2021, entitled "Bridging Unsupervised and Supervised Depth from Focus via All-in-Focus Supervision". The U.S. Provisional Patent Application is hereby incorporated by reference in its entirety.

FIELD OF THE INVENTION

The present invention relates to depth estimation in image or video processing systems. In particular, the present invention relates to machine learning based depth estimation from focus information.

BACKGROUND AND RELATED ART

Depth estimation has been one of the most fundamental computer vision topics for downstream tasks such as Augmented Reality (AR), Virtual Reality (VR), and autonomous driving. Depth estimation uses different cues such as color, semantics, stereo, or difference in the image sequences to predict and fuse depth maps. Depth information enables an increasing number of applications for photography and video conferencing, such as depth-of-field adjustment, background substitution, and changing focus after the picture is taken. In recent development of image or video capturing devices, an active or passive depth sensing technique is embedded in each capturing device to retrieve depth information. Active depth sensing solutions such as Time-of-Flight (ToF) and structural light, are often more expensive and power-consuming due to the need of specialized hardware. Passive techniques, such as binocular or multi-view stereo, are more cost and power efficient compared to the active depth sensing techniques, but more prone to errors in texture-less regions.

Deep learning based stereo matching approaches tackle this problem in a data-driven way by learning depth estimation directly from input images. However, it requires a large amount of high-quality paired training data, which are time consuming and expensive to acquire. Some other issues encountered by the stereo matching approaches include imperfect training data, synthesized and unrealistic input images, and inaccurately registered depth maps. Some unsupervised learning approaches are developed to address this problem, these approaches rely on image reconstruction loss and consistency loss without the need of ground truth depth data. The domain gaps are mitigated by training directly with real world stereo images without corresponding registered depth maps.

Another relatively under-explored technology for depth estimation is defocus blur. The task of depth-from-focus (or defocus) aims to estimate the depth map of a scene from a focal stack. The focal stack is consisting of multiple images taken at different focal positions by the same camera. This allows consumer auto-focus monocular cameras to estimate depth values without additional hardware. Conventional optimization based depth-from-focus approaches estimate the level of sharpness for each pixel and often suffer from texture-less objects or aperture problems. Deep learning techniques help to overcome these issues but require ground truth depth data for supervised training. It is costly and time-consuming to retrieve focal stacks with registered depth maps, let alone the imperfect depth data obtained by hardware solutions such as ToF sensors. Many works target on synthesizing realistic data to solve the need for data in the target domain, for example, synthesize defocus blur on synthetic dataset with synthetic depth map. However, it is still questionable that the thin lens model for synthesis could precisely represent the real-world optics.

Most of the depth estimation approaches assume that input images are All-in-Focus (AiF), where in real-world scenarios, most images are considered to be defocused in the background or with shallow Depth-of-Field (DoF). Few approaches elaborate on depth estimation for defocused images. Conventional optimization based approaches proposed to estimate depth from focal stack. A variational approach is proposed to generate an index map in which every pixel is assigned to focus position with maximal contrast. Furthermore, deep learning based approaches could model the blurriness more precisely and achieve much better depth quality. Some approaches find the relationship between relative blur and disparity to enhance the robustness for matching. Depth from focus sweep video targets on estimating depth from images with successive focus positions. Deep learning based approaches further improve the depth quality and try to remove the defocus blur for single defocused image. Collecting data in the target domain becomes significant that would directly have influence on the results of deep learning approaches. However, the collection of real-world data is often costly and time consuming. Many works target on synthesizing realistic data to solve the need for collecting data in the target domain.

BRIEF SUMMARY OF THE INVENTION

Embodiments of a depth estimation from focus method for an image or video processing system comprise receiving input image data containing focus information, generating an intermediate attention map from the input image data containing focus information by an Artificial Intelligence (AI) model, normalizing the intermediate attention map into a depth attention map via a first normalization function, and deriving expected depth values for the input image data containing focus information from the depth attention map. The AI model is trained unsupervisedly by one or more focus-based training materials. An example of the input image data containing focus information is a focal stack comprising a stack of images with varying focus positions, and another example of the input image data containing focus information is post-capture refocusing photos. The post-capture refocusing photos may be captured from a light-field camera.

An embodiment of the focus-based training material is at least a portion of a photo captured with an aperture smaller than an aperture used for capturing any image in the focal stack. Another embodiment of the focus-based training material is at least a portion of an aperture shrinking photo captured from the light-field camera. Another embodiment of the focus-based training material is a ground truth All-in-Focus (AiF) images output from an AiF image generator, where a sharpness value of the ground truth image is larger than a sharpness value of each image in the focal stack.

In some embodiments, the AI model is shared for both depth estimation and AiF image reconstruction tasks, and the depth estimation from focus method further comprises normalizing the intermediate attention map into an AiF attention map via a second normalization function and deriving an expected AiF image from the AiF attention map and the input data containing focus information. Some examples of the first normalization function normalize the intermediate attention map into a flatter probability distribution and some examples of the second normalization function normalize the intermediate attention map into a sharper probability distribution. For example, the first normalization function is a softplus normalization function and the second normalization function is a softmax normalization function. The AI model is trained by a ground truth depth map supervisedly or the AI model is trained by the ground truth AiF image unsupervisedly according to various embodiments of the present invention. In one embodiment, the AI model is trained by a ground truth depth map supervisedly when the depth estimation task is performed. In one embodiment, the AI model is trained by comparing the expected depth values and the ground truth depth map corresponding to the input image data containing focus information. In another embodiment, the AI model is trained by the ground truth AiF image unsupervisedly when the AiF image reconstruction task is performed. In this embodiment, the AI model is trained by comparing the expected AiF image and the ground truth AiF image corresponding to the input image containing focus information. For unsupervised depth estimation, the AI model is trained by the ground truth AiF image through minimizing a total loss combining an AiF training loss and a smoothness loss according to an embodiment, where the AiF training loss represents a difference between the expected AiF image and corresponding ground truth AiF image.

The expected depth values of the input image data containing focus information are derived from the depth attention map and focus positions of the input image data containing focus information. In some embodiments of the present invention, the AI model is on-device trained to fit a current circumstance or environment by obtaining real-time ground truth AiF images and updating AI model parameters by training the AI model with the real-time ground truth AiF images. The AI model is a deep learning network or a machine learning network, for example, a backbone of the AI model is an encoder-decoder network consisting of three-dimensional (3D) convolutions. The AI model can be trained by ground truth AiF images or ground truth depth values, and after the AI model parameters is updated by training the AI model, at least one value pre-stored in a register or memory for the AI model is modified.

Aspects of the disclosure further provide an apparatus for depth estimation from focus in an image or video processing system. The apparatus comprising one or more electronic circuits configured to receive input image data containing focus information, generating an intermediate attention map from the input image data containing focus information by an AI model, normalizing the intermediate attention map into a depth attention map via a first normalization function, and deriving expected depth values for the input image data containing focus information from the depth attention map. The AI model in the apparatus can be trained by one or more focus-based training materials such as ground truth AiF images.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
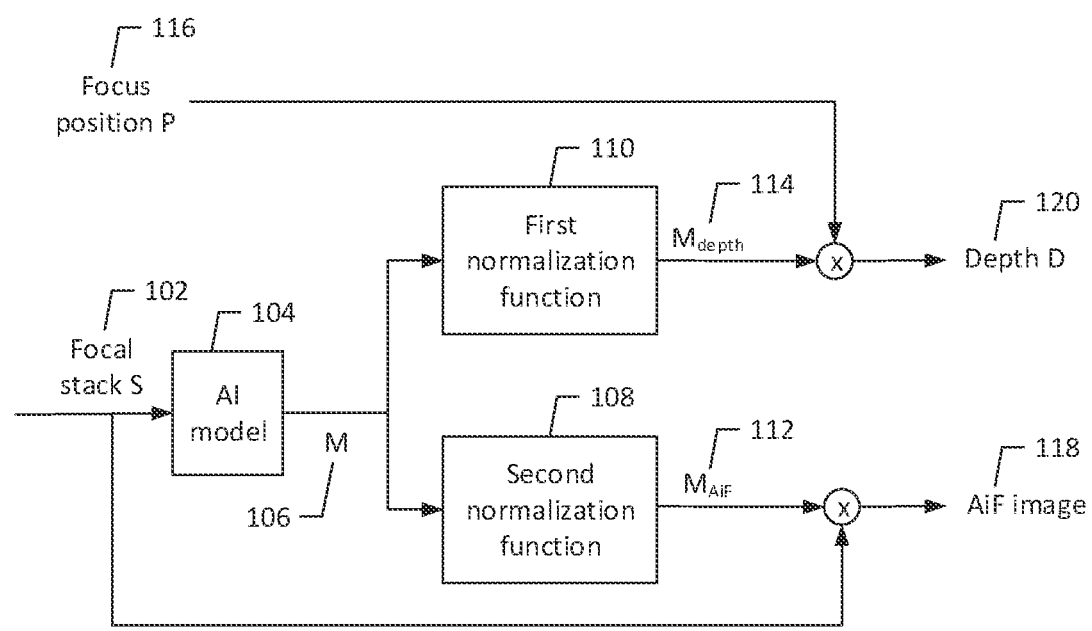
FIG. 1 illustrates an exemplary system of depth estimation from focus according to an embodiment of the present invention.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Overview of the Depth from Focus System Some embodiments of the present invention perform depth estimation from input image data containing focus information through an Artificial Intelligence (AI) model. The AI model of the present invention can be trained either supervisedly with ground truth depth maps or unsupervisedly with only focus-based training materials. Examples of the focus-based training material include at least a portion of a ground truth All-in-Focus (AiF) image, at least a portion of a photo captured with a small aperture, and at least a portion of an aperture shrinking photo captured from a light-filed camera. Some embodiments of the present invention perform depth estimation and AiF image reconstruction jointly from input image data containing focus information. These two tasks, depth estimation and AiF image reconstruction, are accomplished by a shared AI model according to embodiments of the present invention by exploiting the relationships between these two tasks. The shared AI model can be trained with depth-based training materials such as ground truth depth maps or focus-based training materials such as ground truth AiF images. Compared to acquiring high quality depth-based training materials such as ground truth depth maps in the conventional approaches, acquiring focus-based training materials such as ground truth AiF images are relatively easy. For example, the ground truth AiF images can be captured with small apertures and long exposures. The AI models in some embodiments of the present invention learn depth estimation from input image data containing focus information unsupervisedly. That is, domain gaps can be mitigated with test time training on real world data, even when ground truth depth data are not available.

Network Architecture of the Depth from Focus System FIG. 1 illustrates an overview of a depth estimation from focus system according to the embodiments of the present invention. Depth estimation from focus aims to recover depth values from input image data containing focus information through defocus cues. Some examples of the input image data containing focus information 102 is a stack of images with varying focus positions, and post-capture refocusing photos captured from light-field cameras or other techniques. The stack of images with varying focus positions is also referred to as a focal stack, for example, the focal stack is a set of images captured with different focus by a camera on the capturing device. A light-field camera captures spatially distributed light rays. By re-rendering digitized light field data, multi-view or variable aperture images could be displayed after capturing. As light-field camera provides multi-view scenes from different camera positions, it could help computational photography perform better than common camera devices. Given a focal stack $S \in R^{H*W*3*F}$ of F images with gradually varying focus positions $P \in R^{H*W*1*F}$, the depth estimation method produces several attention representations through an Artificial Intelligence (AI) model. As shown in FIG. 1, the input image data containing focus information 102 are feed to an AI model 104 to produce an intermediate attention map M 106. The AI model 104 can be understood as a kernel or network with AI model parameters trained by one or more ground truth AiF images or by one or more ground truth depth maps. The AI model 104 is also known as a deep learning network or a machine learning network that can be shared for both the tasks of depth estimation and AiF image reconstruction. According to some embodiments of the present invention, the AI model 104 is a shared network for depth estimation and AiF image reconstruction, which is different from the prior art methods using separate networks for these two tasks, respectively. According to the prior art methods, the network parameters of the separate networks are separately trained and determined, the computations performed in the separate networks are independent, and the registers or memory used for storing network parameters and associated software programing of the separate networks are different. The AI model 104 according to the present invention is a shared network for these two tasks, so the AI model parameters are separately trained and determined, the computations performed in the shared network are shared by the two tasks, and the registers or memory used for storing AI model parameters and software programing are the same. An example of the backbone of the AI model 104 of the present invention is the Inception3D, where the AI model 104 is an encoder-decoder network consisting of three-dimensional (3D) convolutions. The encoder reduces the resolution of input image data while the decoder reconstructs information to increase back the resolution. In another example of the AI model 104, the encoder-decoder network keeps the resolution unchanged through encoding and decoding. With the 3D convolution, defocus cues could be better captured across frames and thus facilitate the tasks of depth estimation and AiF image reconstruction. The AI model 104 can also handle focal stacks with arbitrary sizes attributed to the nature of 3D convolution. In another example, the backbone of the AI model 104 includes two-dimensional (2D) convolutions, which applies a global pooling layer as a communication tool between several weights-sharing 2D convolution nets.

Attention Mechanism The output of the AI model 104 is an intermediate attention map $M \in R^{H*W*1*F}$ 106. The underlying expectation of the intermediate attention map M 106 is that it should reflect the probability of each focus position leading to the maximal sharpness. The intermediate attention map M 106 can benefit the tasks of depth estimation and AiF image reconstruction. For depth estimation, the intermediate attention map M 106 is normalized into a depth attention map $M^{depth}$ 114 via a first normalization function 110. An example of the first normalization function 110 is a softplus normalization function as shown in the following equations.

$$M^{depth} = \varsigma(M), \quad \text{Equation (1)}$$

where                                                                    Equation (2)

$$M^{depth}_{i,j,1,t} = P \frac{ln(1 + \exp(M_{i,j,1,t}))}{\sum_{n=1}^{F} ln(1 + \exp(M_{i,j,1,t}))}.$$

The softplus function is a smooth version of the ReLU function. The depth attention map $M^{depth}$ 114 can also be interpreted as the probability distribution because the softplus function ensures non-negativeness and the softplus function normalizes M 106 into a valid probability distribution for depth estimation. The expected depth value 120 of each pixel is derived from the depth attention map $M^{depth}$ 114 and the focus positions P 116 of the focal stack 102 as shown in FIG. 1 and Equation (3).

$$D_{i,j,1} = \Sigma_{t=1}^{F}(M^{depth} \cdot P)_{i,j,1,t} \quad \text{Equation (3)}$$

For AiF image reconstruction, the depth estimation from focus system performs similar procedures as depth estimation except that the normalization function is different. The AiF attention map $M^{AiF}$ 112 is derived from the intermediate attention map M 106 by a second normalization function 108 as shown in FIG. 1. For example, the second normalization function 108 for AiF image reconstruction generates a sharper probability distribution than the first normalization function 110 for depth estimation. For example, a softmax normalization function is used in AiF image reconstruction. The equations for normalizing the intermediate attention map M 106 into the AiF attention map $M^{AiF}$ 112 via the softmax function are shown in the following.

$$M^{AiF} = \sigma(M), \quad \text{Equation (4)}$$

where                                                                    Equation (5)

$$M^{AiF}_{i,j,1,t} = P \frac{\exp(M_{i,j,1,t})}{\sum_{n=1}^{F} \exp(M_{i,j,1,t})}.$$

The AiF attention map $M^{AiF}$ 112 is then used for AiF image reconstruction based on the focal stack S 102. Each pixel of an expected AiF image 118 is expressed by Equation (6) based on the AiF attention map $M^{AiF}$ 112 and the focal stack S 102.

$$I_{i,j,1} = \Sigma_{t=1}^{F}(M^{AiF} \cdot S)_{i,j,1,t} \quad \text{Equation (6)}$$

Depth and AiF images are separately estimated according to two different normalization functions such as softmax and softplus functions to tackle the problem of sparse focal stacks. Sparse focal stacks refer to focal stacks having small stack sizes and focus positions inside each sparse focal stack are not dense. The normalization function with a sharper distribution is chosen for AiF reconstruction. For each pixel of an AiF image, a sharpest pixel along the stack dimension is selected during AiF image reconstruction. A flatter distribution leads to multiple pixels with highest sharpness. Blending multiple pixels inside a sparse stack usually does not generate a sharpest pixel. The softmax normalization function is therefore applied to the intermediate attention to pursue the peaking phenomenon to extract a clearest pixel for each pixel in the AiF image. For depth estimation, a sharper distribution such as the softmax normalization function results in severe quantization for sparse focal stacks because it simply selects the nearest focal position of maximal sharpness. On the other hand, a normalization function leads to a flatter distribution such as the softplus normalization function is more accurate for depth prediction by interpolation among sparse focal positions. The softmax and softplus functions are examples of normalization functions applied to derive depth values and AiF images, it is possible for the system to apply another normalization function to the intermediate attention map to generate depth values or AiF images.

Supervised or Unsupervised Depth Estimation As shown in FIG. 1, the intermediate attention map M 106 generated by the AI model 104 of the depth estimation from focus system bridges depth estimation task and AiF image reconstruction task, which does not necessitate intermediate supervisory signals. Moreover, there is no learnable parameters after generating the intermediate attention map M 106. The expected depth values 120 and AiF images 118 output from the depth estimation from focus system are simply generated by applying fixed normalization functions 110 and 108 to the intermediate attention M 106. In some preferred embodiments, the fixed normalization function for deriving the expected depth values 120 normalizes the intermediate attention map 106 into a flatter probability distribution while the fixed normalization function for deriving the expected AiF image 118 normalizes the intermediate attention map M 106 into a sharper probability distribution. Even when depth-based training materials such as ground truth depth maps are not available, the AI model 104 shared between the two tasks can still be trained unsupervisedly with one or more focus-based training materials. An example of the focus-based training material is at least a portion of one or more ground truth AiF images. That is, the AI model 104 of the depth estimation from focus system can be trained supervisedly or unsupervisedly with or without depth-based training materials such as ground truth depth maps. In one embodiment, the AI model 104 is trained by at least a portion of one or more ground truth AiF images to generate an intermediate attention map M 106, and depth values 120 for a focal stack S 102 is estimated by normalizing the intermediate attention map M 106. The ground truth AiF images can be easily acquired to train the AI model 104 for both the depth estimation and AiF image reconstruction tasks. In other words, the AI model 104 can be generally trained in a foundry with basic ground truth depth data or basic ground truth AiF images, and then be more accurately trained on a device (also referred as on-device trained) to fit the current circumstance, environment, or setting by obtaining real-time ground truth AiF images. An embodiment of the ground truth AiF images is photos captured with small apertures, where the aperture for capturing the ground truth AiF image is smaller than the aperture for capturing any image in the focal stack. Another embodiment of the ground truth AiF image is generated by an aperture shrinking photo captured from a light-field camera. In yet another embodiment, the ground truth AiF image can be an image from any all-in-focus image generator such that the sharpness of the ground truth AiF image is larger than the sharpness of each image in the focal stack. Sharpness describes the clarity of details in an image. By converting the image into a frequency domain, regions in the image having condense details will have larger amplitude at the high frequencies, whereas regions in the image having few details will have lower amplitude at the high frequencies. In other words, sharpness reflects the high frequency power in the block-wise spectrum. The focus-based training material can be defined as at least a block in an image having larger amplitudes in high frequencies compared to the high frequency amplitudes of the corresponding block(s) of other images in the focal stack.

Figure 2A:
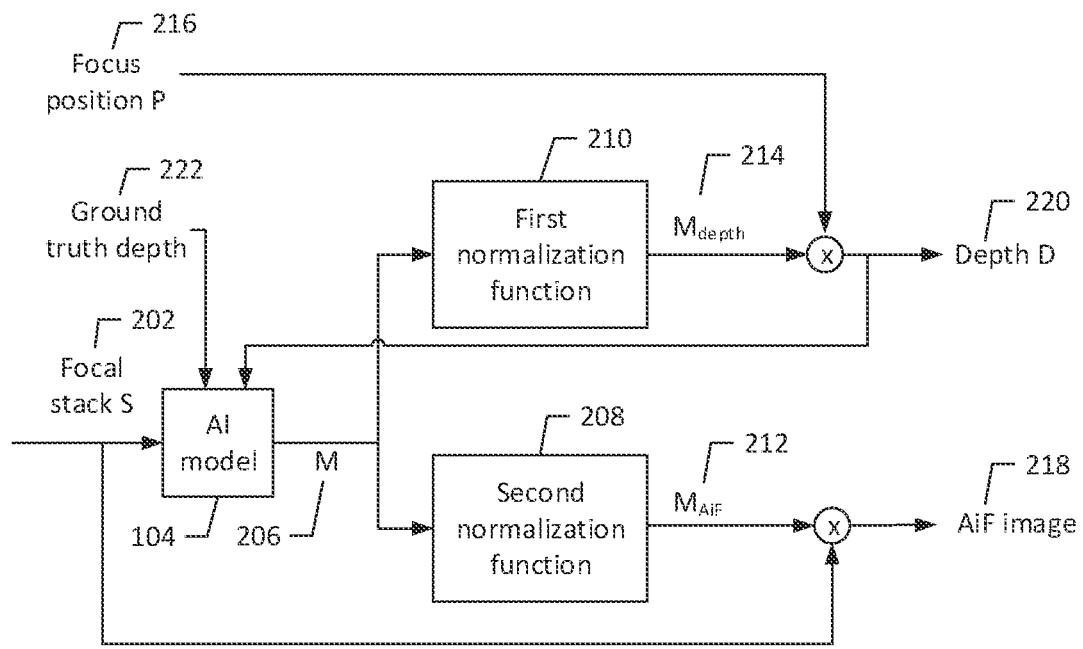
FIG. 2A illustrates supervised learning for the AI model in the depth estimation from focus system according to an embodiment of the present invention.

Training Loss For embodiments of supervised depth estimation, FIG. 2A illustrates the AI model trained by a ground truth depth map with a simple Li loss as shown in Equation (7).

$$L_{supervised} = L_{depth} = E[\|D - D_{gt}\|_1], \quad \text{Equation (7)}$$

where $D_{gt}$ stands for the ground truth depth. An AI model 204 generates an intermediate attention map M 206 for a focal stack S 202. A first normalization function 210 is applied to the intermediate attention map M 206 to generate a depth attention map $M_{depth}$ 214. A second normalization function 208 is applied to the intermediate attention map M 206 to generate a AiF attention map $M_{AiF}$ 212. Expected depth values D 220 are derived from the depth attention map $M_{depth}$ 214 and the focus positions 216. An expected AiF image 218 is derived from the AiF attention map $M_{AiF}$ 212 and the focal stack S 202. The AI model 204 is trained supervisedly by minimizing the $L_{supervised}$ loss between the ground truth depth map 222 and the expected depth values D 220.

Figure 2B:
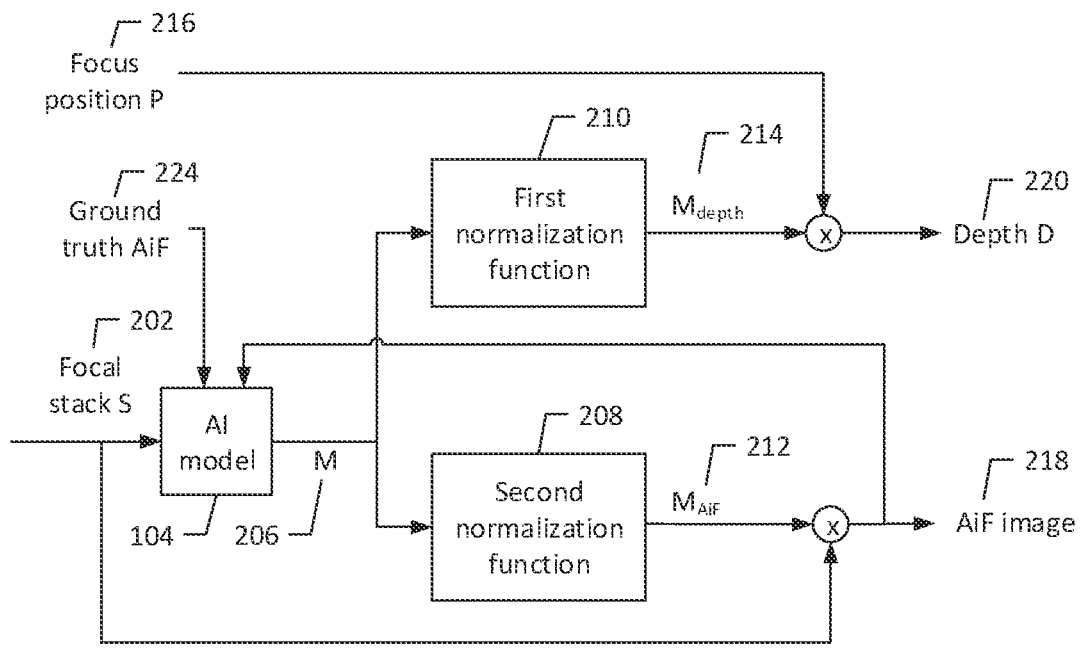
FIG. 2B illustrates unsupervised learning for the AI model in the depth estimation from focus system according to an embodiment of the present invention.

For embodiments of unsupervised depth estimation, FIG. 2B illustrates the AI model trained by a Li loss with AiF supervision.

$$L_{AiF} = E[\|I - I_{gt}\|_1], \quad \text{Equation (8)}$$

where $I_{gt}$ stands for the ground truth AiF image 224. Furthermore, the depth map can be locally smooth using an edge-aware weighting as shown in Equation (9). The smoothness loss is defined as:

$$L_{smooth} = E\left[ W_x \frac{\partial D_{i,j,1}}{\partial x} + W_y \frac{\partial D_{i,j,1}}{\partial y} \right], \quad \text{Equation (9)}$$

where  Equation (10)

$$W_x = \exp\left(-\frac{\lambda X}{3} \frac{\partial I_{i,j,1}}{\partial x}\right),$$

and $$W_y = \exp\left(-\frac{\lambda X}{3} \frac{\partial I_{i,j,1}}{\partial y}\right),$$

and λ is a hyper-parameter for the edge weighting based on the ground truth AiF image. The total loss of the unsupervised depth estimation is a combination of the AiF training loss and smoothness loss.

$$L_{unsupervised} = L_{AiF} + \alpha L_{smooth}, \quad \text{Equation (11)}$$

where α indicates the importance of the smoothness loss. An AI model 204 in FIG. 2B receives a focal stack S 202 and outputs an intermediate attention map M 206. A first normalization function 210 normalizes the intermediate attention map M 206 into a depth attention map $M_{depth}$ 214 while a second normalization function 208 normalizes the intermediate attention map M 206 into an AiF attention map $M_{AiF}$ 212. Expected depth values D 220 are derived by the depth attention map $M_{depth}$ 214 and focus positions P 216, and an expected AiF image 218 is derived by the AiF attention map MAW 212 and the focal stack S 202. The AI model 204 is trained unsupervisedly by minimizing the total loss combining the AiF training loss and smoothness loss, where the AiF training loss represents a difference between the expected AiF image 218 and corresponding ground truth AiF image 224.

The AI model of the depth estimation from focus system is trained by minimizing the training loss of supervised or unsupervised depth estimation. The deep learning training of the present invention can be on-device training as the ground truth AiF image can be easily obtained by the device without any additional sensor. Some advantages of the depth estimation from focus system include low cost as auxiliary sensors such as IR sensors are not needed to collect ground truth depth and the depth map is more accurate than stereo matching approaches. The AI model parameters of the AI model are updated during the training to pursue better quality of depth estimation, where some values pre-stored in the registers or memory for the AI model are modified. The updated model parameters are used to do mathematical operations with input data, or values that comes after a series of operations with input data, which is also called features in machine learning. The output of the depth estimation from focus system is a depth map which is useful in many computer vision applications. Some product applications and fields that could implement the depth estimation from focus system of the present invention are robots, surveillance cameras, self-driving cars, and Augmented Reality (AR) and Virtual Reality (VR).

Figure 3:
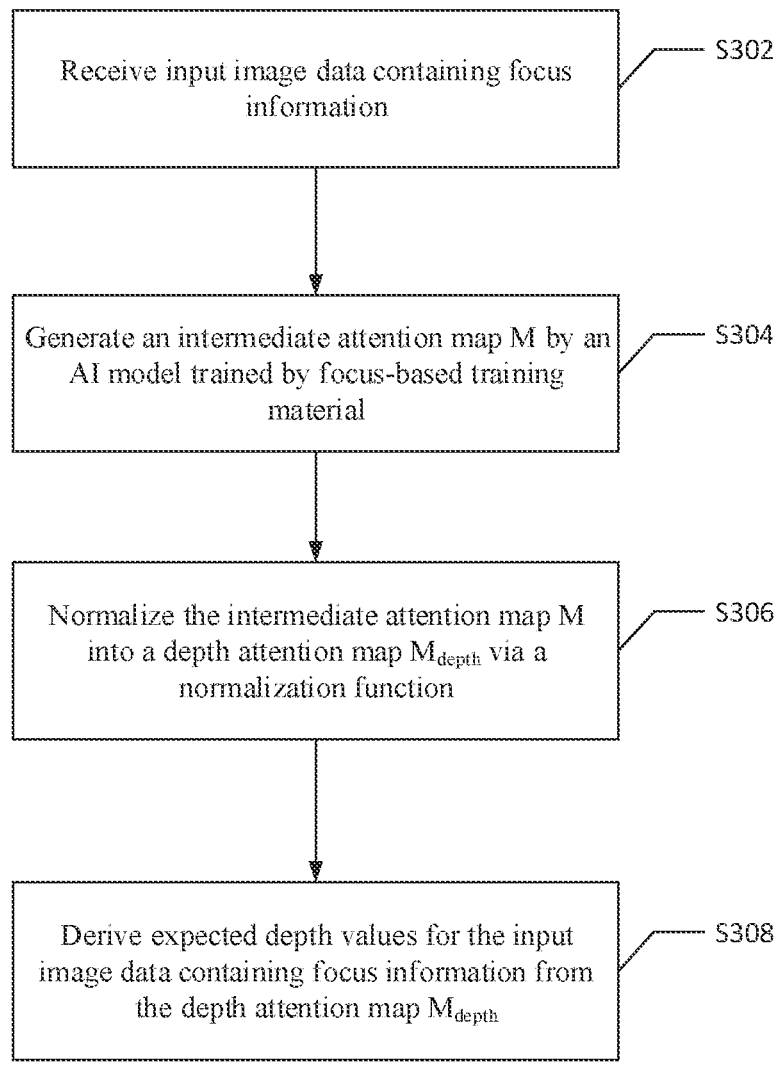
FIG. 3 is a flowchart illustrating estimating depth values from input image data containing focus information according to an embodiment of the present invention.

Representative Flowcharts for an Embodiment of Present Invention FIG. 3 is a flowchart illustrating an embodiment of a depth estimation from focus method in an image or video processing system. The image or video processing system receives input image data containing focus information in step S302. For example, the input image data containing focus information is a focal stack. An AI model generates an intermediate attention map for the input image data in step S304. The AI model is trained by one or more focus-based training materials in this embodiment, for example, the focus-based training materials is at least a portion of a ground truth AiF image. The AI model is trained by one or more depth-based training materials in another embodiment, or the AI model is trained by both the focus-based training materials and depth-based training materials in yet another embodiment. An example of the depth-based training material is a ground truth depth map. The AI model is trained in a foundry or the AI model is on-device trained. In step S306, the intermediate attention map is normalized into a depth attention map via a normalization function. The depth attention map is a normalized attention map indicating the probability distribution of each focus position leading to the maximal sharpness for depth estimation. The image or video processing system derives expected depth values for the input image data containing focus information from the depth attention map in step S308.

Figure 4:
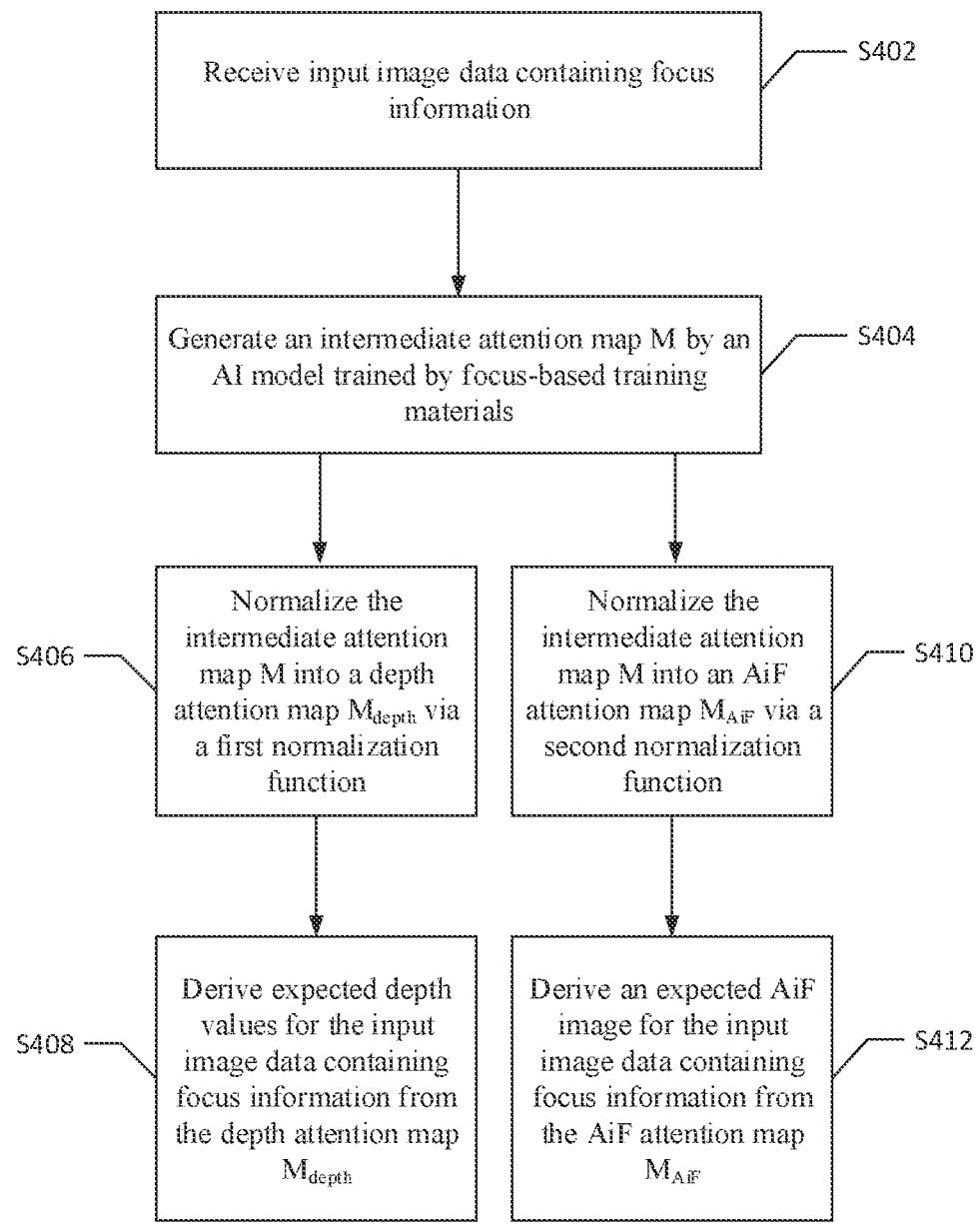
FIG. 4 is a flowchart illustrating estimating depth values from input image data containing focus information according to another embodiment of the present invention.

FIG. 4 is a flowchart illustrating another embodiment of a depth estimation from focus method in an image or video processing system. In step S402, input image data containing focus information such as a focal stack is received by the image or video processing system. An AI model generates an intermediate attention map for the input image data in step S404. The AI model is trained by one or more focus-based training materials in this embodiment. The AI model is trained by one or more depth-based training materials in another embodiment, or the AI model is trained by both the focus-based training materials and depth-based training materials in yet another embodiment. The AI model is a shared network used for both the depth estimation and AiF image reconstruction tasks. The intermediate attention map generated by the AI model is normalized into a depth attention map via a first normalization function in step S406. Expected depth values for the input image data containing focus information are derived from the depth attention map in step S408. The intermediate attention map is also normalized into an AiF attention map via a second normalization function in step S410. An expected AiF image for the input image data containing the focus information is derived from the AiF attention map in step S412. In an embodiment, the expected AiF image corresponds to the entire input image data. However, it should be noted that the expected AiF image does not necessarily correspond to the entire input image data. For example, in an embodiment, the input image data consists of a first portion and a second portion, and the expected AiF image only corresponds to the first portion of the input image data. In this embodiment, another expected AiF image corresponding to the second portion of the input image data may be derived from the AiF attention map in a subsequent step for training the AI model. Accordingly, a first ground truth image corresponding to the first portion of the input image data and a second ground truth image corresponding to the second portion of the input image data are utilized in this embodiment.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A depth estimation from focus method for an image or video processing system, comprising:
   receiving input image data containing focus information;
   generating an intermediate attention map from the input image data containing focus information by an Artificial Intelligence (AI) model, wherein the AI model is trained by one or more focus-based training materials;
   normalizing the intermediate attention map into a depth attention map via a first normalization function; and
   deriving expected depth values for the input image data containing focus information from the depth attention map.

2. The method of claim 1, wherein the input image data containing focus information is a focal stack comprising a stack of images with varying focus positions.

3. The method of claim 2, wherein the focus-based training material is at least a portion of a photo captured with an aperture smaller than an aperture used for capturing any image in the focal stack.

4. The method of claim 1, wherein the input image data containing focus information is post-capture refocusing photos.

5. The method of claim 4, wherein the focus-based training material is at least a portion of an aperture shrinking photo captured from a light-field camera.

6. The method of claim 1, wherein the focus-based training material is at least a portion of a ground truth All-in Focus (AiF) image output from an AiF image generator, wherein a sharpness value of the ground truth image is larger than a sharpness value of each image in the focal stack.

7. The method of claim 1, wherein the AI model is shared for both depth estimation and All-in Focus (AiF) image reconstruction tasks, and the depth estimation from focus method further comprises normalizing the intermediate attention map into an AiF attention map via a second normalization function and deriving an expected AiF image from the AiF attention map and the input data containing focus information.

8. The method of claim 7, wherein the first normalization function normalizes the intermediate attention map into a flatter probability distribution and the second normalization function normalizes the intermediate attention map into a sharper probability distribution.

9. The method of claim 7, wherein the first normalization function is a softplus normalization function and the second normalization function is a softmax normalization function.

10. The method of claim 7, wherein the AI model is trained by a ground truth depth map supervisedly when the depth estimation task is performed.

11. The method of claim 10, wherein the AI model is trained by comparing the expected depth values and the ground truth depth map corresponding to the input image data containing focus information.

12. The method of claim 10, wherein the AI model is trained by the ground truth AiF image unsupervisedly when the AiF image reconstruction task is performed.

13. The method of claim 12, wherein the AI model is trained by comparing the expected AiF image and the ground truth AiF image corresponding to the input image data containing focus information.

14. The method of claim 7, wherein the AI model is trained by the ground truth AiF image through minimizing a total loss combining an AiF training loss and a smoothness loss, wherein the AiF training loss represents a difference between the expected AiF image and corresponding ground truth AiF image.

15. The method of claim 1, wherein the expected depth values are derived from the depth attention map and focus positions of the input image data containing focus information.

16. The method of claim 1, wherein the AI model is on-device trained to fit a current circumstance by obtaining real-time ground truth All-in Focus (AiF) images and updating AI model parameters by training the AI model with the real-time ground truth AiF images.

17. The method of claim 1, wherein a backbone of the AI model is an encoder-decoder network consisting of three-dimensional (3D) convolutions.

18. The method of claim 1, further comprising modifying at least one value pre-stored in a register or memory for the AI model after training the AI model.

19. A depth estimation from focus apparatus, the apparatus comprising one or more electronic circuits configured for:
    receiving input image data containing focus information;
    generating an intermediate attention map from the input image data containing focus information by an Artificial Intelligence (AI) model, wherein the AI model is trained by one or more focus-based training materials;
    normalizing the intermediate attention map into a depth attention map via a first normalization function; and
    deriving expected depth values for the input image data containing focus information from the depth attention map.

* * * * *